(12) United States Patent
Wahl

(10) Patent No.: US 7,747,645 B2
(45) Date of Patent: Jun. 29, 2010

(54) SYSTEM AND METHOD FOR CALENDAR-BASED ANOMALOUS ACCESS DETECTION

(75) Inventor: Mark Frederick Wahl, Austin, TX (US)

(73) Assignee: Informed Control Inc., Austin, TX (US)

( * ) Notice: Subject to any disclaimer, the term of this patent is extended or adjusted under 35 U.S.C. 154(b) by 614 days.

(21) Appl. No.: 11/724,736

(22) Filed: Mar. 17, 2007

(65) Prior Publication Data

US 2008/0228721 A1 Sep. 18, 2008

(51) Int. Cl.
*G06F 17/30* (2006.01)

(52) U.S. Cl. .................................. 707/783; 707/784
(58) Field of Classification Search ............... 717/175; 707/4, 783, 784
See application file for complete search history.

(56) References Cited

U.S. PATENT DOCUMENTS

| | | | |
|---|---|---|---|
| 5,564,016 A | 10/1996 | Korenshtein | |
| 5,594,430 A | 1/1997 | Cutter | |
| 5,899,979 A | 5/1999 | Miller | |
| 6,651,173 B1 | 11/2003 | Rodriguez | |
| 6,684,250 B2 | 1/2004 | Anderson | |
| 6,757,740 B1 | 6/2004 | Parekh | |
| 6,947,978 B2 | 9/2005 | Huffman | |
| 7,036,148 B2 | 4/2006 | Brook | |
| 7,117,531 B2 | 10/2006 | Fukasawa | |
| 7,127,743 B1 | 10/2006 | Khanolkar | |
| 2007/0244875 A1* | 10/2007 | Bodin et al. | 707/4 |
| 2009/0113415 A1* | 4/2009 | Wilbrink et al. | 717/175 |

OTHER PUBLICATIONS

Should I call now? Understanding what context is considered when deciding whether to initiate remote communication via mobile devices, Edward S. De Guzman, Moushuni Sharmin, Brian P. Bailey, Universiry of Illinios, ACM, May 28-30, 2007, pp. 1-8.*
IP VPN remote access SLA, Verizon busines, Google.com, pp. 1-5.*
Should I call now? Understanding what context is considered when deciding whether to initiate remote communication via mobile devices, Edward S. De Guzman, Moushuni Shamin, Brian P. Bailey, University of Illinois, ACM, May 28-30, 2007, pp. 1-8.*
Covington, "Generalized Role-Based Access Control for Securing Future Applications", 23rd National Information Systems Security Conference, Baltimore MD, Oct. 2000, p. 6.
Dawson, "Internet calendaring and scheduling core object specification (iCalendar)", Request for Comments 2445, Internet Engineering Task Force, Nov. 1998, p. 84.

* cited by examiner

*Primary Examiner*—Mohammad Ali
*Assistant Examiner*—Donald Lawson

(57) ABSTRACT

An access control system is augmented with the ability to categorize access requests as anomalous, by correlating the time and location of the requesting user with information provided by the requesting user's calendar entries. These entries provide the dates and times that a user is anticipated to be located in a particular geographic region.

6 Claims, 13 Drawing Sheets

NETWORK TABLE

| NETWORK | MASK | LOCATION ID |
|---|---|---|
| | | |
| | | |

74

LOCATION TABLE

| LOCATION ID | NAME | TYPE | CONTAINING LOCATION ID |
|---|---|---|---|
| | | | |
| | | | |

76

TRANSIT TIME TABLE

| EMBARK LOCATION ID | DISEMBARK LOCATION ID | TRANSIT TIME |
|---|---|---|
| | | |
| | | |

ACCESS TABLE

80

| USER ID | ACCESS DATE | LOCATION ID |
|---|---|---|
|  |  |  |
|  |  |  |

CURRENT LOCATION TABLE

82

| USER ID | DECISION DATE | LOCATION ID |
|---|---|---|
|  |  |  |
|  |  |  |

ANOMALY TABLE

84

| USER ID | ACCESS DATE | ADDRESS | INFO |
|---|---|---|---|
|  |  |  |  |
|  |  |  |  |

FIG. 7

SYSTEM AND METHOD FOR CALENDAR-BASED ANOMALOUS ACCESS DETECTION

FEDERALLY SPONSORED RESEARCH

Not applicable

SEQUENCE LISTING FOR PROGRAM

Not applicable

BACKGROUND OF THE INVENTION

1. Field of Invention

This invention relates generally to intrusion detection and access control in enterprise computer networks.

2. Prior Art

Many network-based services control whether access to their service is permitted by remote users. These services require users of the service to be authenticated, and the services follow an access control decision function with a policy or rule set to determine which users are permitted access to the service.

In order to distinguish between legitimate and illegitimate access to resources, even where the policy or rule set grants access, some existing prior art network-based services extend the decision function to incorporate the date and time that the request is being made. For example, the service may deny access requests that are received outside of normal working hours for the business running the service.

Some prior art systems include a method for determining the geographic location of a user connecting across the Internet to a web site, a network-based service. This method can be used by a web site to control access to a particular element of the web site to different categories of users based on the geographic location of the user making the request.

Objects and Advantages

In modern networks, it is necessary for an access control system to determine whether an access request received by a network-based service is anomalous. Whether a request is anomalous can be determined by comparing the time of the request and the network location of the user's client making the request with the predicted location of the user at that time. Anomalous requests may be caused by unauthorized individuals who have gained access to a user's credentials, or unauthorized individuals who are replaying authentication activities in order to gain the user's access rights.

Prior art systems that incorporate location into the access control decision function may make the determination of network location only to category requests by the location of the client, and do not incorporate the anticipated location of the user into the decision function. In organizations with multiple sites or in deployments in which the users are frequently traveling, a system that does not incorporate a user's travel plans into the decision function may inappropriately deny access or grant alarms for legitimate access requests. Furthermore, a system that does not incorporate a user's travel plans into the decision function may not be capable of detecting fraudulent access requests from an unauthorized individual that has gained access to a user's credentials. Also, a prior art intrusion detection system that uses trends of location history may not be able to correctly categorize a user's legitimate change in location.

The anomalous access detection system using the algorithm described in this invention would be able to detect that a user access on Wednesday from location SFO, or an access on Friday from an external location, are anomalous. (These accesses might indicate that the user's credentials were stolen). By contrast, an intrusion detection system working solely by trends and patterns in the access history itself might report a legitimate external access on Tuesday as anomalous, and might fail to report an external access on Friday as anomalous.

SUMMARY

This invention defines and implements an intrusion detection method for an access control function that is a component of a network-based service. This method compares the parameters of a client's access request, including the identity of the user making the request and the location of the client as derived from the network address of the client, with the contents of databases that contain the schedules for authorized users, the anticipated locations for those users, and the minimum transit times between those locations. Based on this method, the access control function can deny the request if the user's access is anomalous, as this may be caused by a request from an unauthorized individual impersonating the user.

DRAWINGS—FIGURES

FIG. 6 is a diagram illustrating the contents of the address mapping database.

FIG. 7 is a diagram illustrating the contents of the user location database.

DRAWINGS—REFERENCE NUMERALS

Figure 1:
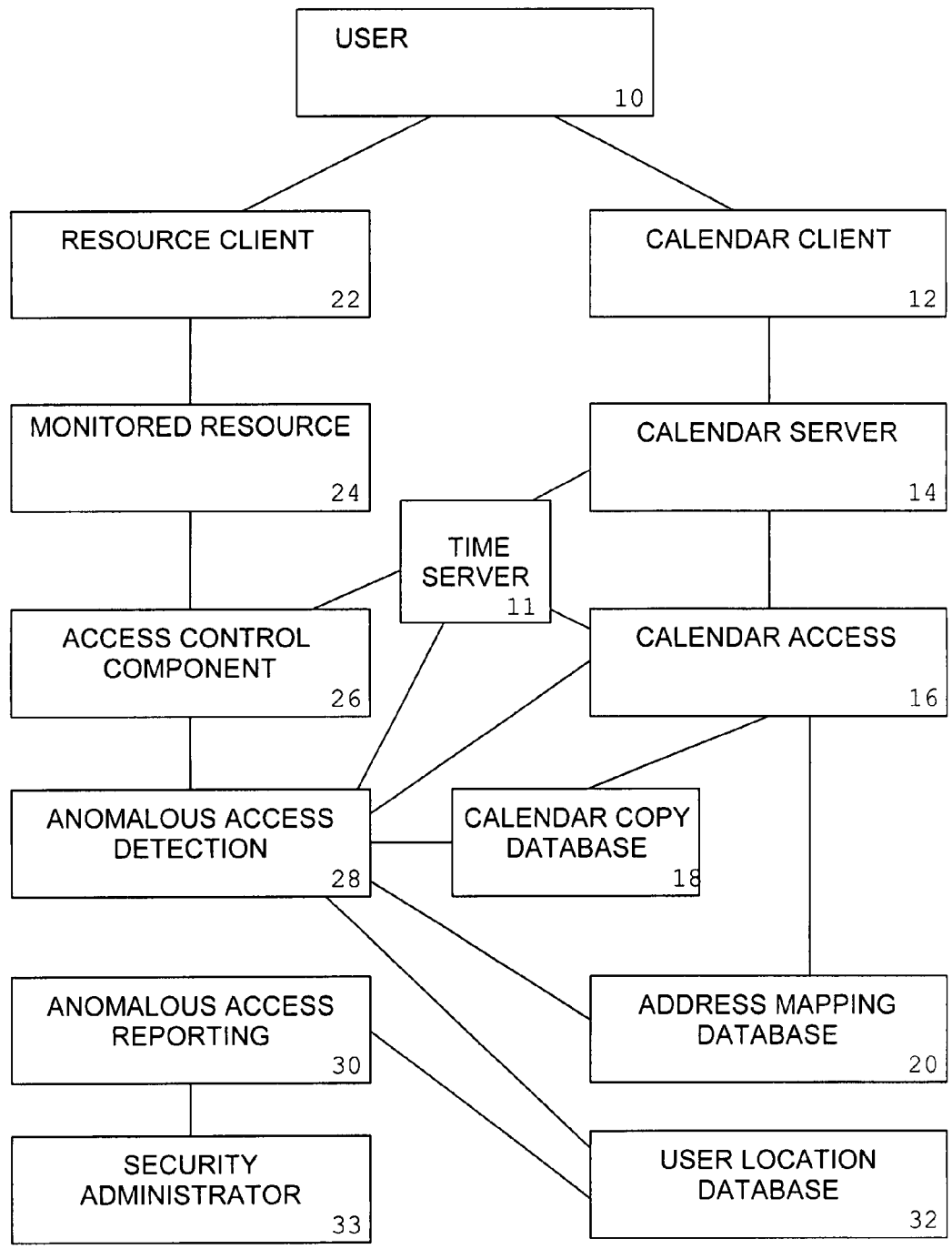
FIG. 1 is a diagram illustrating the components of the system for calendar-based anomalous access detection.
Figure 2:
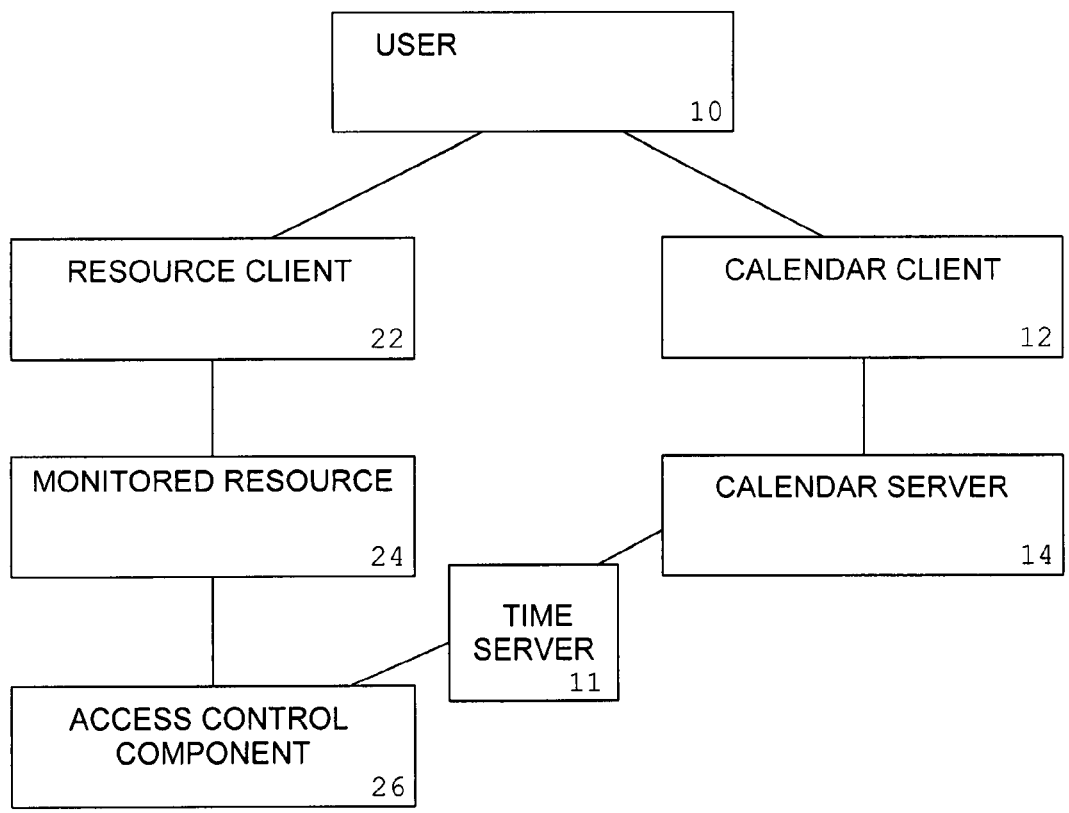
FIG. 2 is a diagram illustrating the components of prior art systems for access control and for enterprise calendar management.

10 User
11 Time Server
12 Calendar Client
14 Calendar Server
16 Calendar Access
18 Calendar Copy Database 20 Address Mapping Database
22 Client
24 Monitored Resource
26 Access Control Component
28 Anomalous Access Detection Component
30 Anomalous Access Reporting Component
32 User Location Database
33 Security Administrator
70 Calendar table
72 User status table
74 Network table
76 Location table
78 Transit time table
80 Access table
82 Current location table
84 Anomaly table
90 Calendar server computer
92 Resource server computer
94 Analysis computer
96 Administrator workstation
98 Time server computer
100 Network switch
102 Database server computer
104 DMZ firewall
106 Frontend web server computer
108 Network switch
110 Firewall router
112 Internet service provider
114 Internet
116 Internet service provider
118 Client workstation
130 Computer
132 CPU
134 System bus
136 Hard disk interface
138 Hard disk
140 Operating system software on hard disk
142 Application software on hard disk
144 BIOS ROM
146 RAM
148 Operating system state in memory
150 Application state in memory
152 Network interface
154 LAN switch
172 Computer
174 CPU
176 System bus
178 Monitor
180 Video interface
182 USB interface
184 Keyboard
186 Mouse
188 Hard disk interface
190 BIOS ROM
192 Hard disk
194 Operating system software on hard disk
196 Application software on hard disk
198 Network interface
200 RAM
202 Operating system state in memory
Application state in memory
206 LAN switch

DETAILED DESCRIPTION

The invention comprises the following components:

A user (10), or another person authorized by that user, is responsible for keeping the user's calendar up-to-date. This is typically done using a calendar client (12), which communicates with a calendar server (14).

A calendar access component (16) is responsible for extracting information about future events and their locations for all users from the calendar server (14) and placing the data into a private copy of the calendar database (18).

A user (10) instructs client applications (22), such as web browsers, to access one or more resources (24) which are being monitored by an intrusion detection system. When a user accesses a monitored resource, the monitored resource will forward the identity of the user and other fields of the request to an access control component (26), to determine if the user is allowed access.

An access control component (26) for each resource determines whether the user has access to a resource. These access attempt records are provided to the anomalous access detection component (28).

An anomalous access detection component (28) relies upon the calendar copy database (18), as well as an address to location mapping database (20) and a user location database (32).

An anomalous access reporting component (30) reports anomalous access events to a security administrator (33), for example via email messages or an XML-based transport protocol to an intrusion detection system.

A time server component (11) maintains time synchronization between the access control component (26), the calendar server component (14), and the anomalous access detection component (28).

The calendar client (12) enables a user to create, view, modify and delete their scheduled travel plans on a calendar server. The client permits the user to specify a set of calendar entries. Each entry includes the user's anticipated arrival date and time, departure date and time, and location. Changes made by the user in their calendar client are sent to the calendar server (14).

The calendar server (14) maintains the set of calendars of the users of the system in a persistent store. Each calendar comprises a set of records. Each record specifies the start date and time, and end date and time, for an activity involving the user. Records may specify a recurring interval, such as every day or every week. There may be multiple records with overlapping times. A calendar record may contain a location name where the activity takes place. The location name may be an IP address range, a code indicating a particular company office or building, or a geographic region, such as a continent, country, state or province.

Each user will have a calendar record that specifies their default location with an end date for the record having a value in the future. For example, a user who only uses the computer resources during normal US business hours might have a recurring event of "in office", scheduled for every Monday-Friday 8 AM-6 PM local time, with a location code of the office. Someone who works from home at potentially all hours might also have a recurring event 7×24 of "at home", with a location code of the home. As another example, for someone who is traveling from one office to another and may access the company resources while in transit, the calendar system might have records similar to:

| | |
|---|---|
| Monday 8 AM-6 PM US/Pacific: | location SFO |
| Monday 6 PM-12M US/Pacific: | location home |
| Tuesday 12M US/Pacific-Wednesday 8 AM US/Eastern: | location external |
| Wednesday 8 AM-6 PM US/Eastern: | location NYC |
| Wednesday 6 PM US/Eastern-Friday 8 AM US/Pacific: | location external |
| Friday 8 AM-6 PM US/Pacific: | location SFO |

The calendar access component (16) periodically extracts calendar information from the calendar server (18), restructures and copies this information to the calendar copy database (18) for the benefit of the anomalous access detection component (28). When the data is copied, all times are converted from the time zone in which they were entered to Universal Coordinated Time (UTC). Extraction of data from a user's calendar is needed to occur prior to the use of that data by the anomalous access detection component, so the calendar access component should either frequently poll the calendar server for changes, or be notified by it of changes. This is necessary to prevent an attacker from immediately modifying a user's calendar as soon as they gained access in order to hide their subsequent operations. The calendar access component will suspend obtaining updates for users which have recently made anomalous access requests.

The calendar copy database (18) can be implemented as a relational database. There are two tables in this database, the calendar table (60) and the user status table (62).

The calendar table (70) contains one row for each record in the calendar server that specifies a location and has not yet ended. The rows of this table are created by the calendar access component (16) and are read by the anomalous access detection component (28). The primary key of this table is the RECORD ID column. The columns of this table are:

RECORD ID: a unique identifier for this record,
USER ID: the identifier for the user for this record,
START DATE: the date and time that the event described by this record will begin,
END DATE: the date and time that the event described by this record will end,
COPY DATE: the date and time this row was created by the calendar access component, and
LOCATION ID: the identifier for the location identified by the record.

The user status table (72) contains one row for each user whose status has been marked as anomalous. The rows of this table are created by the anomalous access detection component (28) and are read by the calendar access component (16). The primary key of this table is the USER ID column. The columns of this table are:

USER ID: the identifier for the user,
STATE: whether anomalous access has been detected for a specified user, and
CHANGE DATE: the date this row was last changed.

The resource client (22) is a software client application, such as a web browser, that is operated by a user (10). The resource client establishes a connection across a network, such as the Internet, to the monitored resource (24). The resource client will provide to the monitored resource a source network address, such as an IP address, the username of the user and the credentials necessary for the user to access the resource.

The monitored resource (24) is a network-accessible application. The monitored resource will receive incoming requests from clients. When a request is received, the resource will leverage the access control component (26) to determine whether the client sending the request is authorized to access the resource.

The access control component (26) is a software element leveraged by the monitored resource. The component will receive as input the parameters of a client request, including the identity of the user making the request, from the monitored resource (24). Should the access control component policy decision determine that access should be granted, then the access control component will query the anomalous access detection component to determine if the request is from an anomalous location for that user.

The anomalous access detection component (28) is a software element leveraged by the access control component. This component uses databases that contain user calendars and locations, and network address mappings, to determine if the parameters of a request forwarded from the access control component indicate that the request is from an anomalous location for the user whose identity is part of the request parameters.

The anomalous access reporting component (30) is a software element that generates alerts and reports to the administrator.

The address mapping database (20) can be implemented as a relational database. There are three tables in this database: the network table (74), the location table (76) and the transit time table (78).

The network table (74) contains one row for each network location. The columns of this table are:

NETWORK: the network address prefix of the location,
MASK: an indication of the bit positions in the network address to be considered, and
LOCATION ID: the unique identifier for the location.

At a minimum, there will be one row in the network table for each Classless Inter-Domain Routing (CIDR) IP address block allocated by the Internet Assigned Numbers Authority (IANA), and for each CIDR IP address block allocated by a Regional Internet Registry (RIR), as specified in the IANA document "INTERNET PROTOCOL V4 ADDRESS SPACE" (http://www.iana.org/assignments/ipv4-address-space). Additional rows will be present in the table for networks with a known location.

The location table (76) contains one row for each location. The primary key of the table is the LOCATION ID column. The columns of this table are:

LOCATION ID: a unique identifier for each location,
NAME: the name of the location,
TYPE: the type of location, such as a continent, a country or a city, and
CONTAINING LOCATION ID: the unique identifier for another location that encloses this location.

At a minimum, there will be one row in the location table for each continent, and in these rows, the CONTAINING LOCATION ID column will be null.

The transit time table (78) contains one row for pairs of locations. The transit time table indicates the minimum practical transit time between each possible pair of locations. For most situations the table is symmetric: for example, the time from A to B can be expected to be the same as time from B to A. An example of an asymmetry would be the transit time between facilities operating at different physical security levels: the time to enter into a high-security facility from an low-security facility may be greater than the time to enter into a low-security facility from a high-security facility. For travel between a user's home and local office, the transit time may be a few minutes, but for travel between locations in different US states, or between countries, may be a few hours. This table will assist in detecting anomalies particularly in the case where a user's calendar gives several possible locations for a user during a particular time period. The columns of this table are:

EMBARK LOCATION ID: the unique identifier for the embarkation location,

DISEMBARK LOCATION ID: the unique identifier for the disembarkation location, and TRANSIT TIME: the transit time, in seconds, from the embarkation location to the disembarkation location.

At a minimum, there will be one row in the location transit table for each possible pair of two continents. A row for two contiguous continents will have 0 as the value of the TRANSIT TIME column, and a row for two noncontiguous continents will have as the value of the TRANSIT TIME column the minimum anticipated flight time between those continents.

The user location database (32) can be implemented as a relational database. There are three tables in this database: the access table (80), the current location table (82) and the anomaly table (84).

The access table (80) contains one or more rows for each access control decision that resulted in access being granted. The rows of this table are created and read by the anomalous access detection component (28). The columns of this table are:

USER ID: the identity of the user making the request,

ACCESS DATE: the date and time of the access, and

LOCATION ID: one of the possible locations of the user when the request was made.

The current location table (82) contains rows for each potential location for a user in the system. The rows of this table are created and read by the anomalous access detection component (28). The columns of this table are:

USER ID: the identity of the user,

DECISION DATE: the date and time that the anomalous access detection component added this row, and LOCATION ID: one of the possible locations of the user.

The anomaly table (84) contains one row for each anomalous access detected. The rows of this table are created by the anomalous access detection component (28), and are read by the anomalous access reporting component (30). The columns of this table are:

USER ID: the identity of the user,

ACCESS DATE: the date and time of the access request,

ADDRESS: the network address of the client making the request, and

INFO: additional information about the user's access history.

The time server (11) can be implemented as a network server application. This component provides clock synchronization between the operating systems of each computer system that is reporting time of events to the anomalous access detection component (28), and this component. This clock synchronization can be provided by a protocol such as the Network Time Protocol (NTP). The time server can be provided with the correct time by synchronization with external time servers, via the Internet, or a radio receiver tuned to a time service. The time server can also provide to the anomalous access detection component the skew in times from the other computer systems. The anomalous access detection component may use this information to override the time reports from systems whose clocks are significantly diverged from a reference standard.

Figure 8:
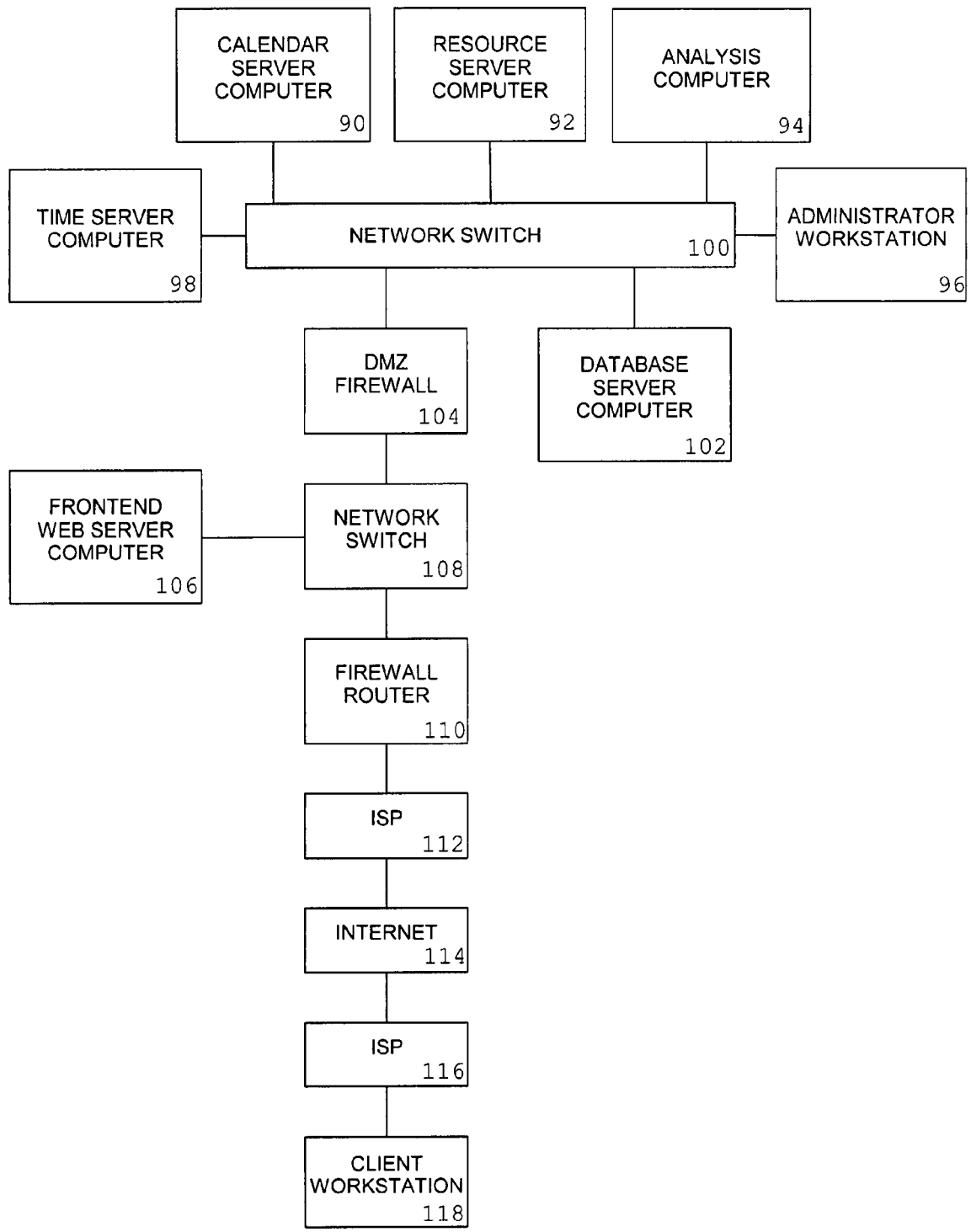
FIG. 8 is a diagram illustrating the components of a computer network supporting the system for detecting anomalous access.

The processing components of this invention can be implemented as software running on computer systems attached to a computer network, as illustrated in FIG. 8.

The calendar server (14) can be implemented as software running on a calendar server computer (90). Examples of calendar server implementations include Microsoft Exchange Server and the Sun Java System Calendar Server.

The monitored resource (24) can be implemented as software running on a resource server computer (92). Examples of monitored resource implementations include web servers such as the Apache Web Server, Apache Tomcat servlet container and Microsoft Internet Information Server. The access control component (26) can be implemented as a software library linked into the monitored resource software.

The calendar access component (16) and anomalous access detection component (28) can be implemented as software running on an analysis computer (94). The anomalous access reporting component (30) can be implemented as a software library linked into the anomalous access detection component.

The security administrator (33) can receive reports from the anomalous access reporting component through software installed on an administrator workstation (96).

The time server (11) can be implemented as software running on a time server computer (98). An example of a time server implementation is the Reference Implementation of Network Time Protocol (NTP).

The calendar copy database (18), address mapping database (20) and user location database (32) can be implemented as databases managed by a relational database server software running on a database server computer (102).

The resource client (22) and calendar client (12) can be implemented as software running on a client workstation (118). Requests sent by the clients to the monitored resource (24) or calendar server (14) are directed by the firewall router (110) to the frontend server computer (106). The frontend server computer will validate whether the requests from the clients are suitable, and if so, forward them to the calendar server computer (90) and the resource server computer (92).

Figure 9:
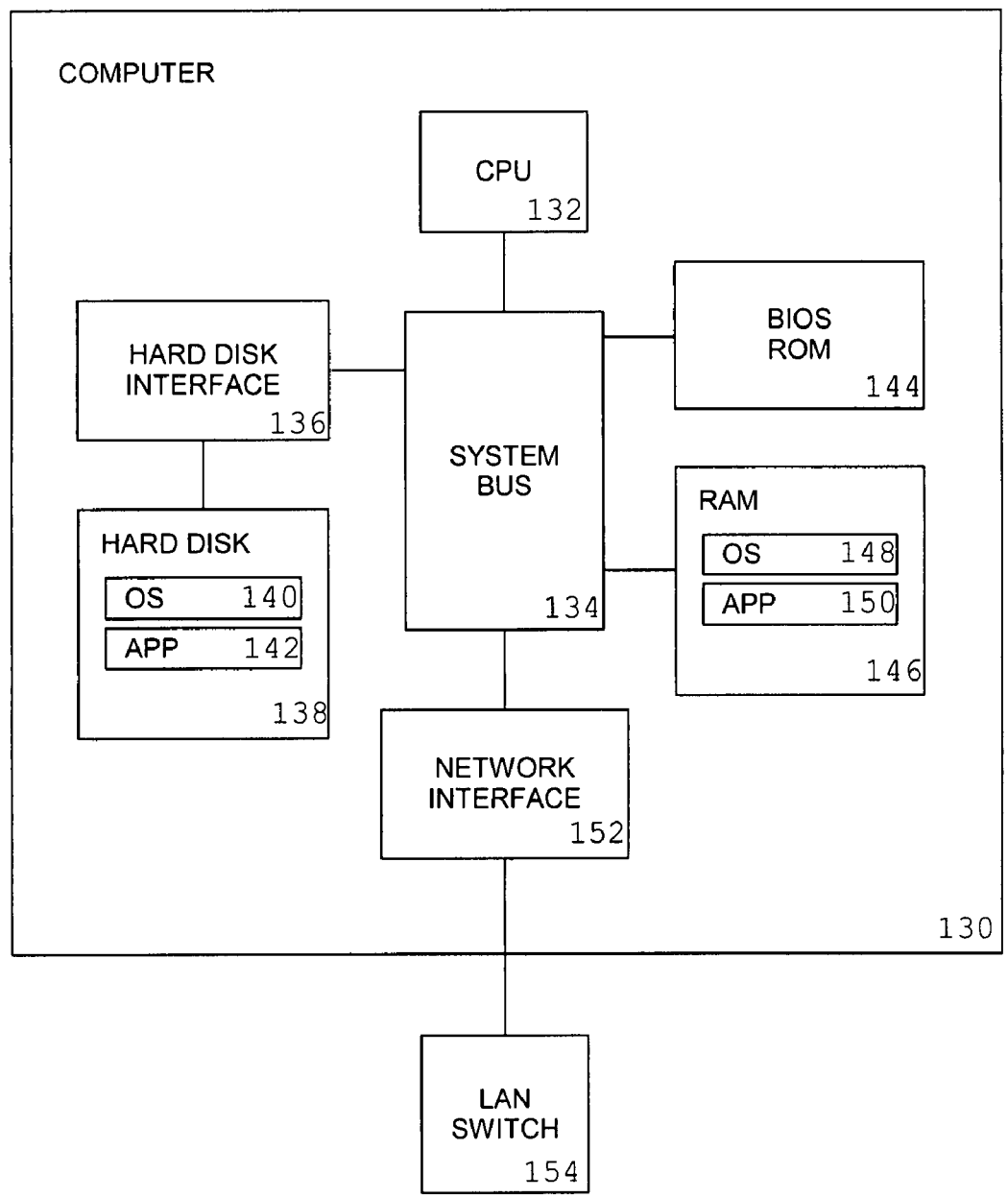
FIG. 9 is a diagram illustrating the components of a server computer.

FIG. 9 illustrates the typical components of a server computer (130). Examples of server computers with these components include the frontend web server computer (106), the time server computer (98), the calendar server computer (90), the resource server computer (92), the analysis computer (94) and database server computer (102). Components of the computer include a CPU (132), a system bus (134), a hard disk interface (136), a hard disk (138), a BIOS ROM (144), random access memory (146), and a network interface (152). The network interface connects the computer to a local area network switch (154). The hard disk (138) stores the software and the persistent state of the operating system (140) and applications (142) installed on that computer. The random access memory (146) holds the executing software and transient state of the operating system (148) and applications (150).

Figure 10:
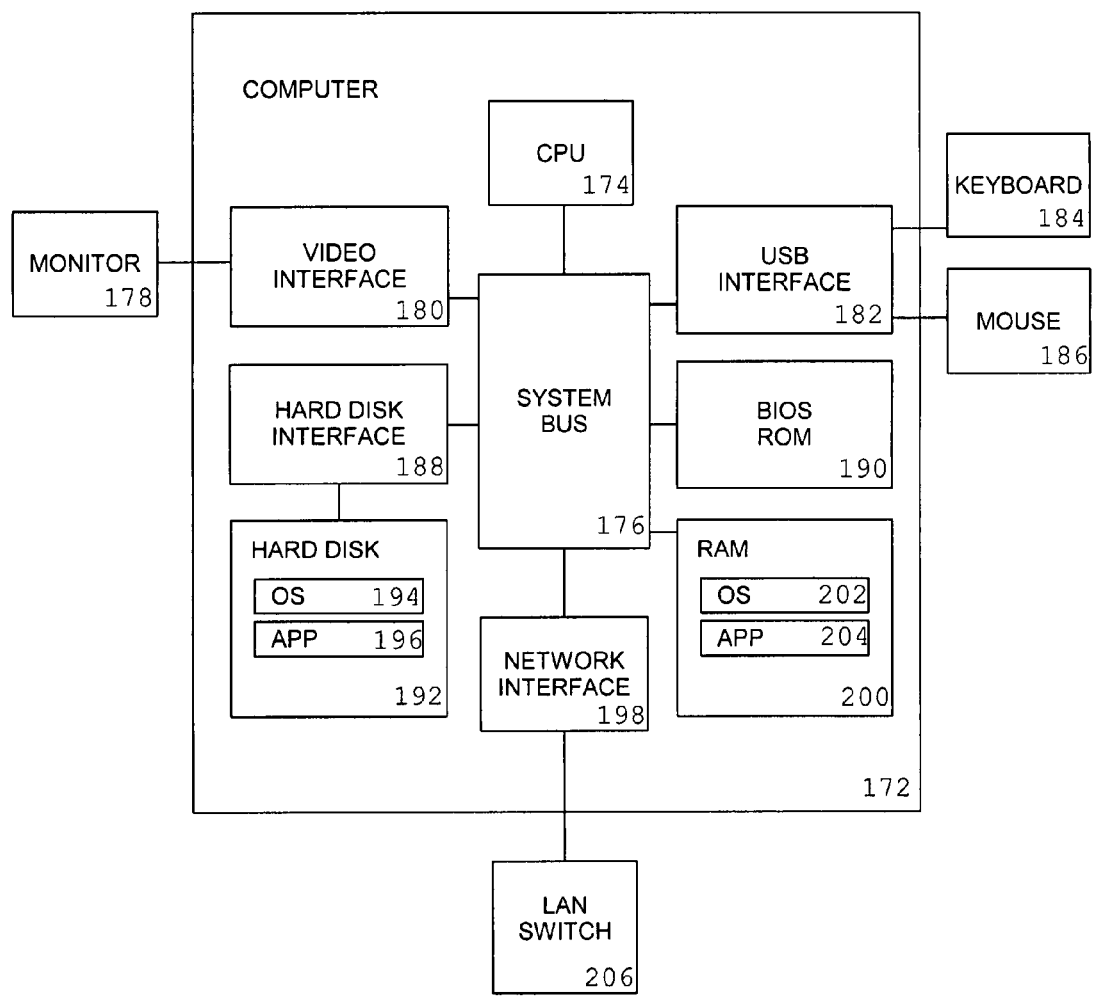
FIG. 10 is a diagram illustrating the components of a workstation computer.

FIG. 10 illustrates the typical components of a workstation computer (172). Examples of workstation computers with these components include the client workstation (118) and administrator workstation (96). Components of the workstation computer include a CPU (174), a system bus (176), a video interface (180) to a monitor (178), a USB interface (182) to a keyboard (184) and mouse (186), a hard disk interface (188), a BIOS ROM (190), a network interface (198), and random access memory (200). The network interface (198) connects the computer to a local area network switch (206). The hard disk (192) stores the software and the persistent state of the operating system (194) and applications (196) installed on that computer. The random access memory (200) holds the executing software and transient state of the operating system (202) and applications (204).

OPERATIONS

Figure 11:
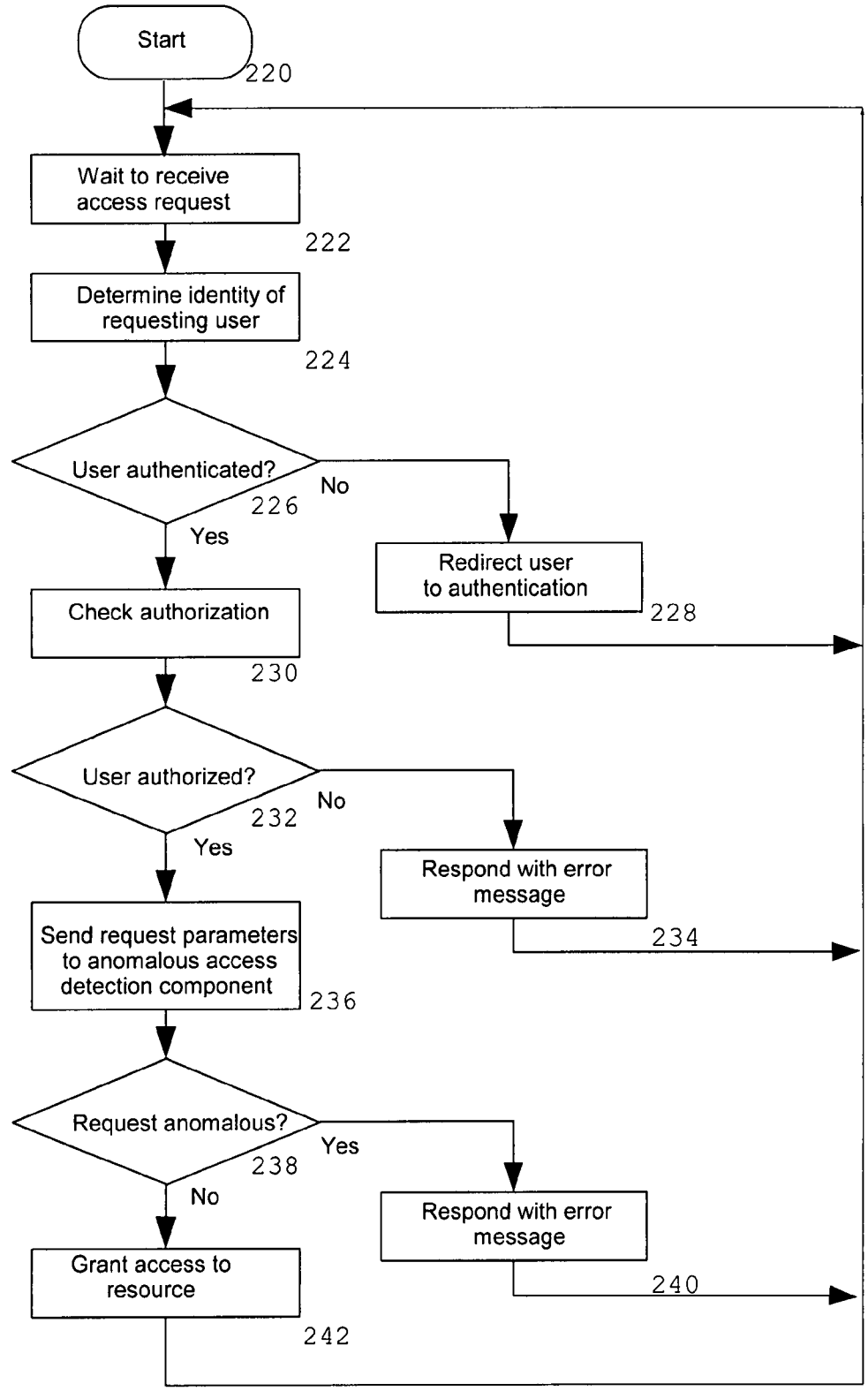
FIG. 11 is a flowchart illustrating the behavior of the access control component.

The behavior of the access control component (26) is illustrated by the flow chart of FIG. 11. There are one or more threads of execution in this component.

At step 222, the thread will wait to receive an access request from the monitored resource (24). At step 224, the thread will determine the identity of the requesting user. In a web-based application, the request from the monitored resource may include reference to a session state managed by the monitored resource across multiple requests, and the identity of the user may be a field in that session state. At step 226, the thread will determine if the user making the request has already been authenticated by the monitored resource. In a web-based application, if there is no session state referenced by the request, or the session state referenced by the request does not have a user identity field, or the session state referenced by the request has expired, then the user has not been authenticated in that session. If the user has not been authenticated, then at step 228 the access control component will respond to the monitored resource to redirect the user to an authentication task. Once the user has been authenticated, at step 230 the thread will check whether the user is authorized to access the resource. Techniques by which an access control component can check user authorization include Mandatory Access Control, Discretionary Access Control, and Role-Based Access Control. At step 232, the thread will determine whether the user has been authorized. If the user is not authorized, then at step 234 the access control component will respond to the monitored resource that the user is not authorized. At step 236, the access control component will send the request parameters to the anomalous access detection component (28), and receive a response from the anomalous access detection component. At step 238, the access control component will determine if the anomalous access detection component indicated that the request was anomalous. If it was, then at step 240 the access control component will respond to the monitored resource that the user's request is not permitted. Otherwise, at step 242, the access control component will respond to the monitored resource to permit access.

Figure 3:
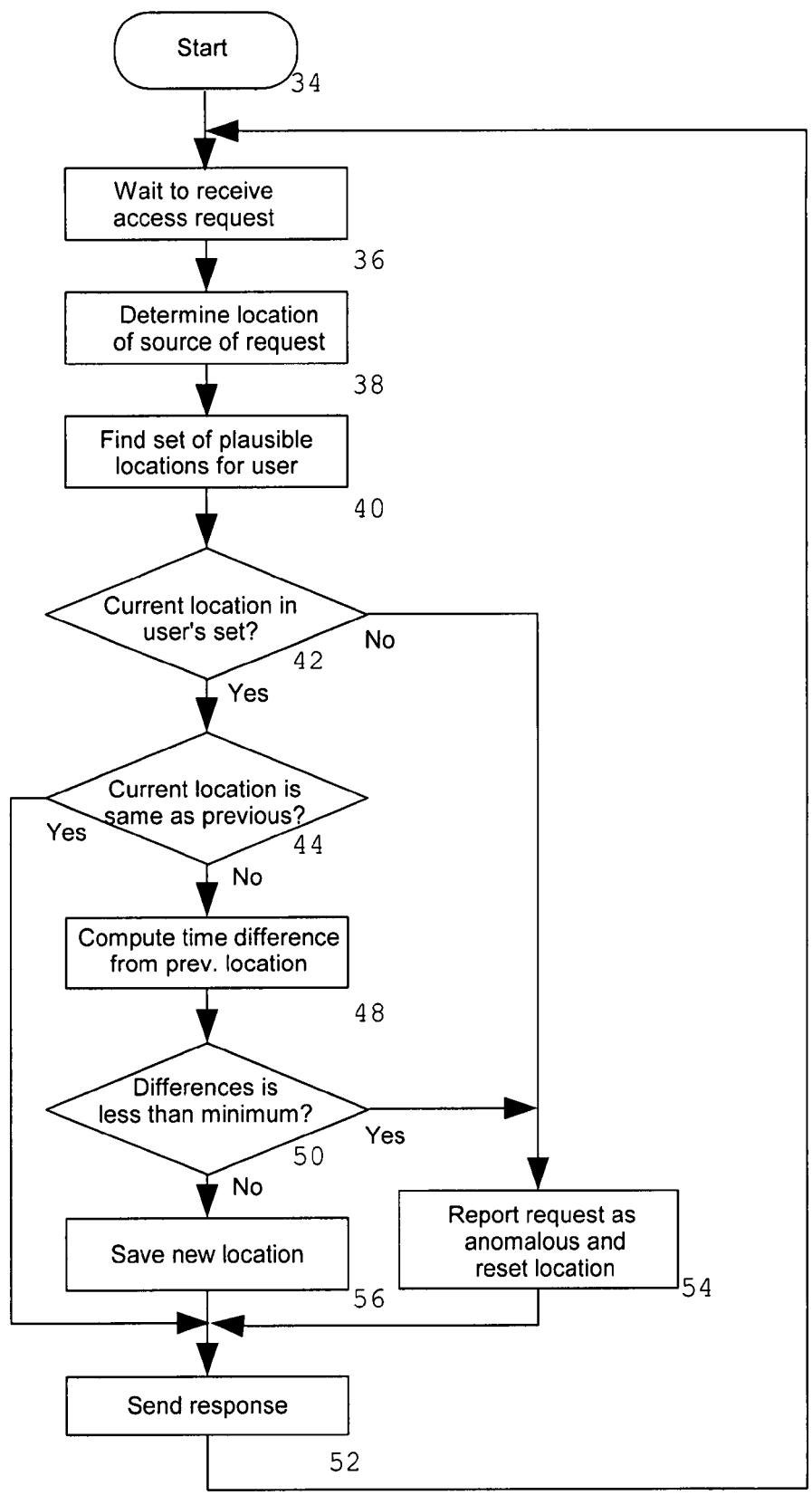
FIG. 3 is a flowchart illustrating the behavior of the anomalous access detection component.

The behavior of the anomalous access detection component (28) is illustrated by the flowchart of FIG. 3. There are one or more threads of execution in this component. At step 36, this thread waits to receive an access request from the access control component (26). At step 38, the thread will determine the location of the source of the request. For example, the request may include a field with the IP address of the resource client.

At step 40, the thread will find the set of plausible locations for the user. The thread will traverse the network table (74) to locate rows in which the network specified by the row includes the IP address of the resource client, and add these to a set of rows. The thread will next select the most specific rows, by removing from this set the rows with network masks that are less specific than other network masks in the set. From this set, the thread will select the values in the LOCATION ID columns to construct a set of location IDs of plausible locations for the user (location ID set A).

At step 42, the thread will determine whether the current location is in the set of locations for the user. First, the thread will obtain a set of rows from the current location table (82) in which the value in the USER ID column matches the user id of the user, as provided by the access control component as a field of the access request, and from the calendar table (70) in which the value of the USER ID column matches the userid of the user, and the date and time of the request is between the values of the START DATE and END DATE columns of the row. The thread will next construct a set of current and predicted location IDs of the user (location ID set B) by selecting the values in the LOCATION ID columns of this set. The thread will then compare the set of location IDs of plausible locations for the user generated at step 40 (location ID set A) with this set of current and predicted location IDs of the user (location ID set C). If the set of current and predicted location IDs of the user (location ID set B) is empty, then processing will continue at step 44. If there is one or more location IDs present in both the set of location IDs of plausible locations for the user (location ID set A) and the set of current and predicted location IDs for the user (location ID set B), then this set of location IDs in common (location ID set C) will be used at step 44.

If there is no location ID present in both the set of location IDs of plausible locations for the user with the set of current and predicted location IDs for the user, then the thread will use the location table (76) to find values of the CONTAINING LOCATION ID column in rows in which the LOCATION ID matches one of the set of location IDs of plausible locations of the user. If containing location IDs are found, then these are added to the set of location IDs of plausible locations of the user (location ID set A). This process is repeated until no new values of CONTAINING LOCATION ID are found that are not already in the set of location IDs of plausible locations of the user (location ID set A). If there are one or more location IDs present in both the set of location IDs of plausible locations for the user (location ID set A) and the set of current and predicted location IDs for the user (location ID set B), then this set of location IDs in common (location ID set C) will be used at step 44. However, if after using the location table, there is still no location ID present in both the set of location IDs of plausible locations for the user (location ID set A) and the set of current and predicted location IDs for the user (location ID set B), then the thread will continue to step 54, where the thread will process the request as anomalous.

At step 44, the thread will determine if the current location of the user in the request is the same as the previous location of the user. If the set of current and predicted location IDs of the user (location ID set B) is empty, then processing will continue at step 52. Otherwise, the thread will compare sets of location IDs to determine if the location has changed. First, the thread will obtain a set of location IDs of current locations of the user (location ID set D) by selecting a set of rows from the current location table (82) in which the value in the USER ID column matches the user id of the user, as provided by the access control component as a field of the access request, and for each row, selecting the value in the LOCATION ID column. Second, the thread will obtain a set of location IDs of predicted locations of the user (location ID set E) by selecting a set of rows from the calendar table (70) in which the value of the USER ID column matches the userid of the user, and the date and time of the request is between the values of the START DATE and END DATE columns of the row, and for each row selecting the value in the LOCATION ID column. Third, the thread will remove from the set of location IDs of predicted locations of the user (location ID set E) location ID values which are not in the set of location IDs in common computed in step 42 (location ID set C). If the set of location IDs of predicted locations of the user (location ID set E) is empty, or the set of location IDs of current locations of the user (location ID set D) is empty, then processing will continue at step 52. If all of location IDs in the set of location IDs of predicted locations of the user (location ID set E) are present in the set of location IDs of current locations of the user (location ID set D), then processing will continue at step 52. Otherwise, if there are location IDs in the set of location IDs of predicted locations of the user (location ID set E) that are not present in the set of location IDs of current locations of the user (location ID set D), then processing will continue at step 48.

Figure 13:
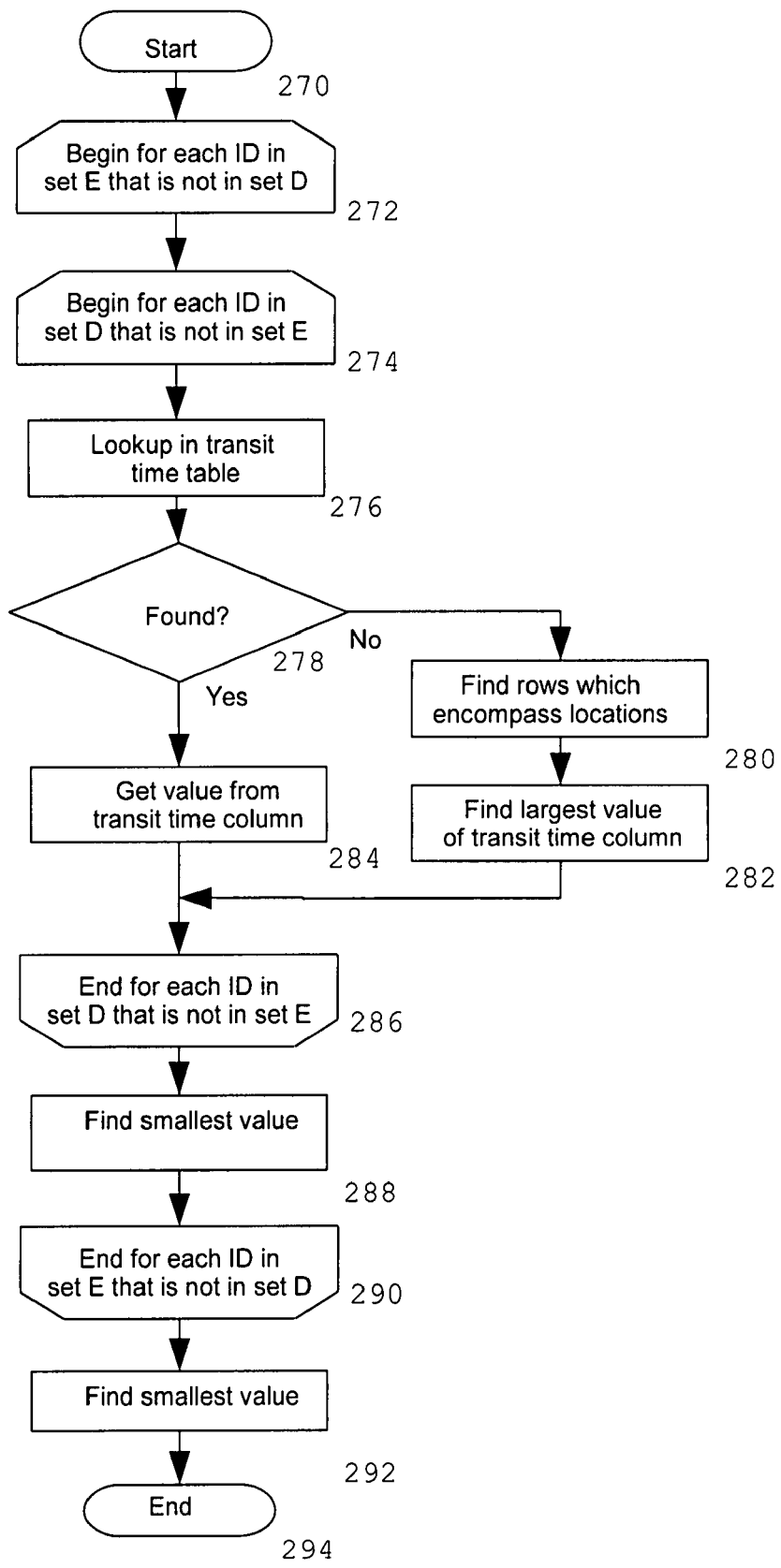
FIG. 13 is a flowchart illustrating the algorithm for computation of the minimum transit time for a pair of current location ID and predicted location ID, used in the calendar anomalous access detection component.

At step 48, the thread will compute the minimum transit time from the previous location to the current location of the user. This value is computed by the thread using the location table (76) and transit time table (78), following the algorithm illustrated in FIG. 13. For each location ID in the set of location IDs of predicted locations of the user (location ID set E) that is not present in the set of location IDs of current locations of the user (location ID set D), the thread will find the minimum transit time for the predicted location ID. The minimum transit time for a predicted location ID is computed by finding the smallest value of each of the values of minimum transit time for a pair of current location ID and predicted location ID, in which there is one value of minimum transit time for a pair of current location ID and predicted location ID for each current location ID in the set of location IDs of current locations of the user (location ID set D) which is not in the set of location IDs of predicted locations of the user (location ID set E). At step 276 in this algorithm, the thread will lookup in the transit time table for a row in which the value of the EMBARK LOCATION ID column is the current location ID and the value of the DISEMBARK LOCATION ID column is the predicted location ID. If a row is found, the value of the TRANSIT TIME column is used in the computation as the minimum transit time for the pair. If a row is not found, then at step 280 the thread will locate the rows in the transit time table in which the value of the EMBARK LOCATION ID column is a location ID of a location which contains the current location ID and the value of the DISEMBARK LOCATION ID column is a location ID of a location which contains the predicted location ID. At step 282, the thread will select as the minimum transit time of the pair the largest value of the TRANSIT TIME column in this set of rows.

Once each of the values of minimum transit time for a predicted location ID have been determined, the thread will then select the smallest value of each of the values of minimum transit time for a predicted location ID to find the overall minimum transit time, and this value will be used at step 50.

At step 50, the thread will compare the difference in request time with the overall minimum transit time. The difference in request time is computed by converting the date and time the request was received from the client to a number of seconds since Jan. 1, 1970 (time T1), converting the latest value of the DECISION DATE column of the rows in the current location table (82) for which the USER ID column matches the user ID of the user in the request to a number of seconds since Jan. 1, 1970 (time T2), and subtracting time T2 from time T1. The overall minimum transit time is computed from step 48. If the difference in request time is less than the overall minimum transit time, then the thread will continue to step 54, where the thread will process the request as anomalous. Otherwise, the thread will continue to step 56.

At step 54, the thread has determined the request to be anomalous. The thread will remove any rows in the user status table (72) in which the value in the USER ID column matches the user ID of the user making the request. The thread will add a row to the user status table (72) in which the value in the USER ID column is the user ID of the user making the request, the value in the STATE column is an indication that anomalous access was detected for this user, and the value in the CHANGE DATE column is the current date and time. The thread will add a row to the anomaly table (84), in which the value in the USER ID column is the user ID of the user making the request, the value in the ACCESS DATE column is the date and time of the request, the value in the ADDRESS column is the network address of the client making the request, and the value in the INFO column is a summary of the user's access history and the sets of locations determined during the processing of this request. The thread will then continue processing at step 52.

At step 56, the thread will save the new location. The thread will remove any rows in the current location table (82) in which the value in the USER ID column matches the user ID of the user making the request. The thread will add a row to the access table (80) for each location ID in the set of location IDs of predicted locations of the user, in which the value in the USER ID column is the user ID of the user making the request, and the value in the ACCESS DATE column is set to the current date and time. The thread will add a row to the current location table (82) for each location ID in the set of location IDs of predicted locations of the user (location ID set E), in which the value in the USER ID column is the user ID of the user making the request, and the value in the DECISION DATE column is set to the current date and time.

At step 52, the thread will send a response to the access control component. The response will indicate whether the thread determined the request to be anomalous. The thread will then repeat to wait for the next incoming request.

Figure 4:
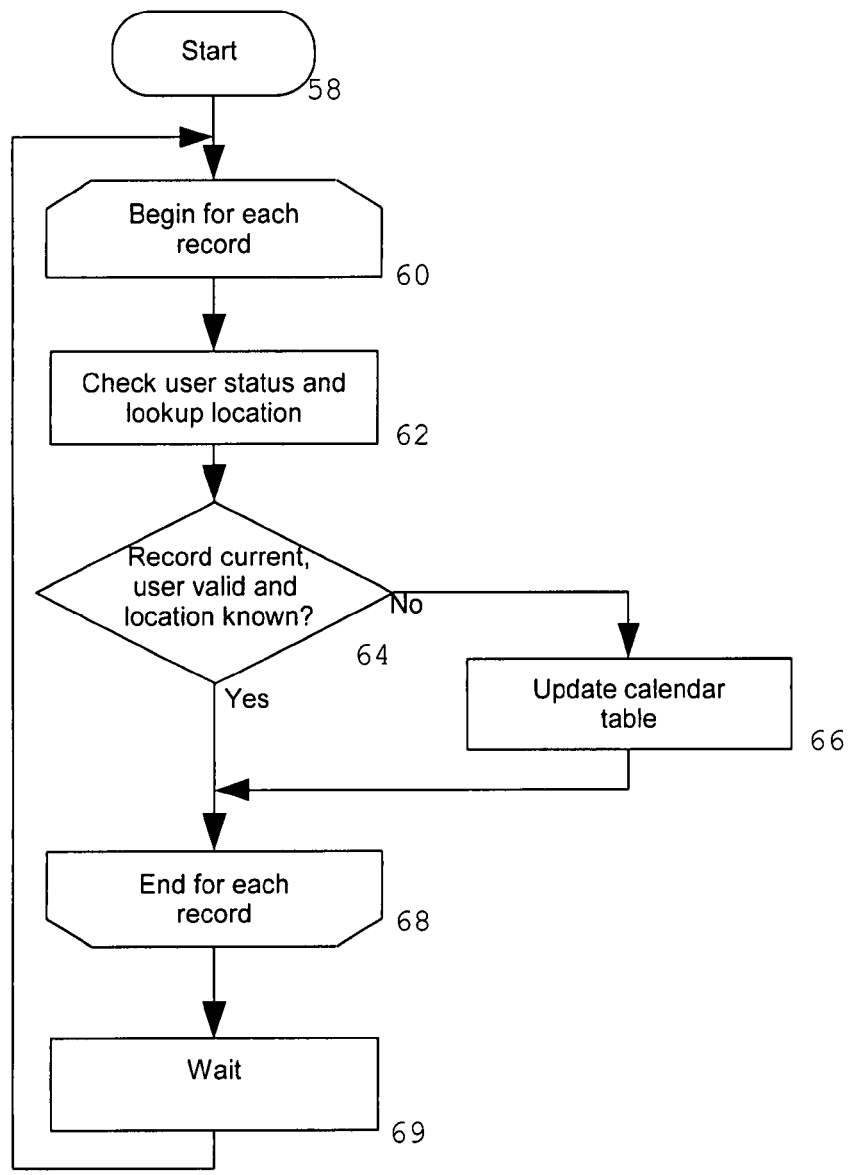
FIG. 4 is a flowchart illustrating the behavior of calendar access component.
Figure 5:
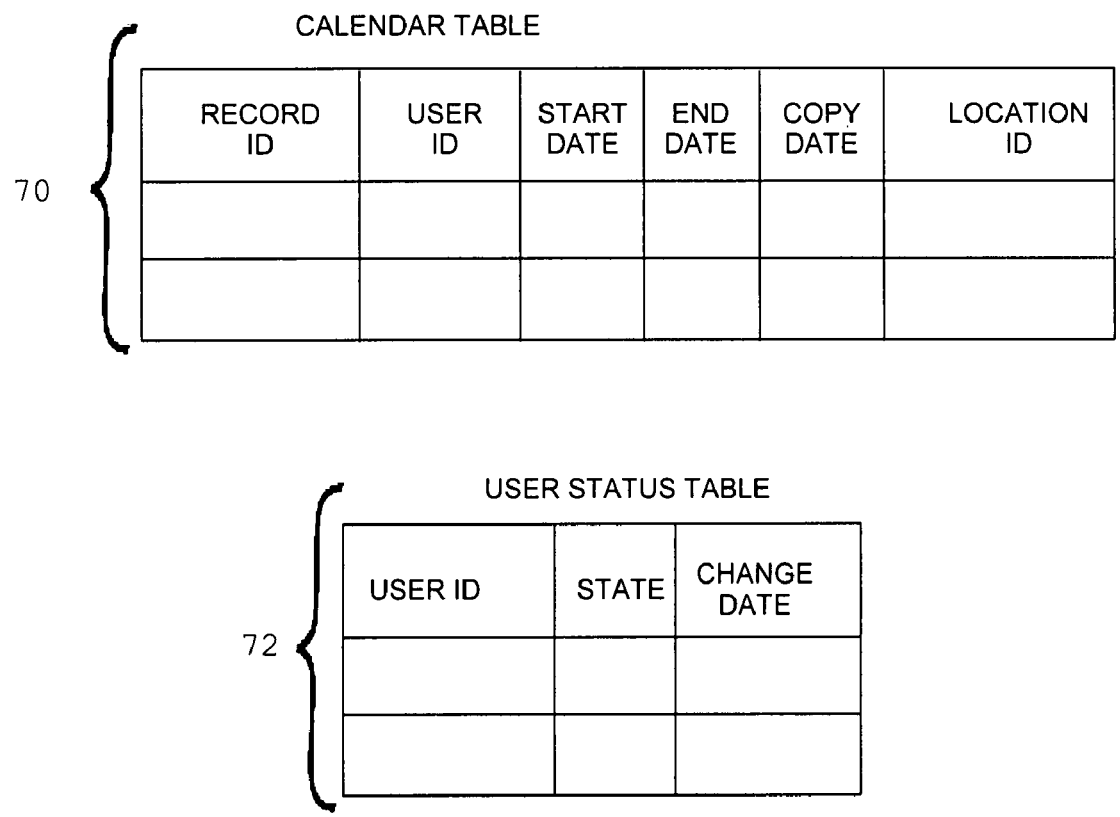
FIG. 5 is diagram illustrating the contents of the calendar copy database table.

The behavior of the calendar access component (16) is illustrated by the flowchart of FIG. 4. There is a single thread of execution in this component.

At step 60, the thread will traverse each record from the calendar server. At step 62, the thread will search the user status table (72) for a row in which the value in the USER ID column matches the user in the record, and will search the location table (76) for a row in which the values of the NAME and TYPE columns match the location in the record. At step 64, the thread will determine if the record is current, the user is valid and the location was identified. A record is current if the end date has not already been reached. A user is valid if no rows were round in the user status table which indicated that the user had recent anomalous access. If the record is current, the user is valid and a location ID was determined from the location table, then at step 66, the thread will update the calendar table (70). If there is no row in the calendar table in which the value in the RECORD ID column matches the record ID of the record, then a row will be added to the calendar table; otherwise, the matching row will be updated. The values of the USER ID, START DATE and END DATE columns are taken from the record, the value of the COPY DATE column is set to the current date and time, and the value of the LOCATION ID column is set to the location ID obtained from the location table. Finally, after traversing all the records in the calendar server, at step 69, the thread will wait before repeating the process.

Figure 12:
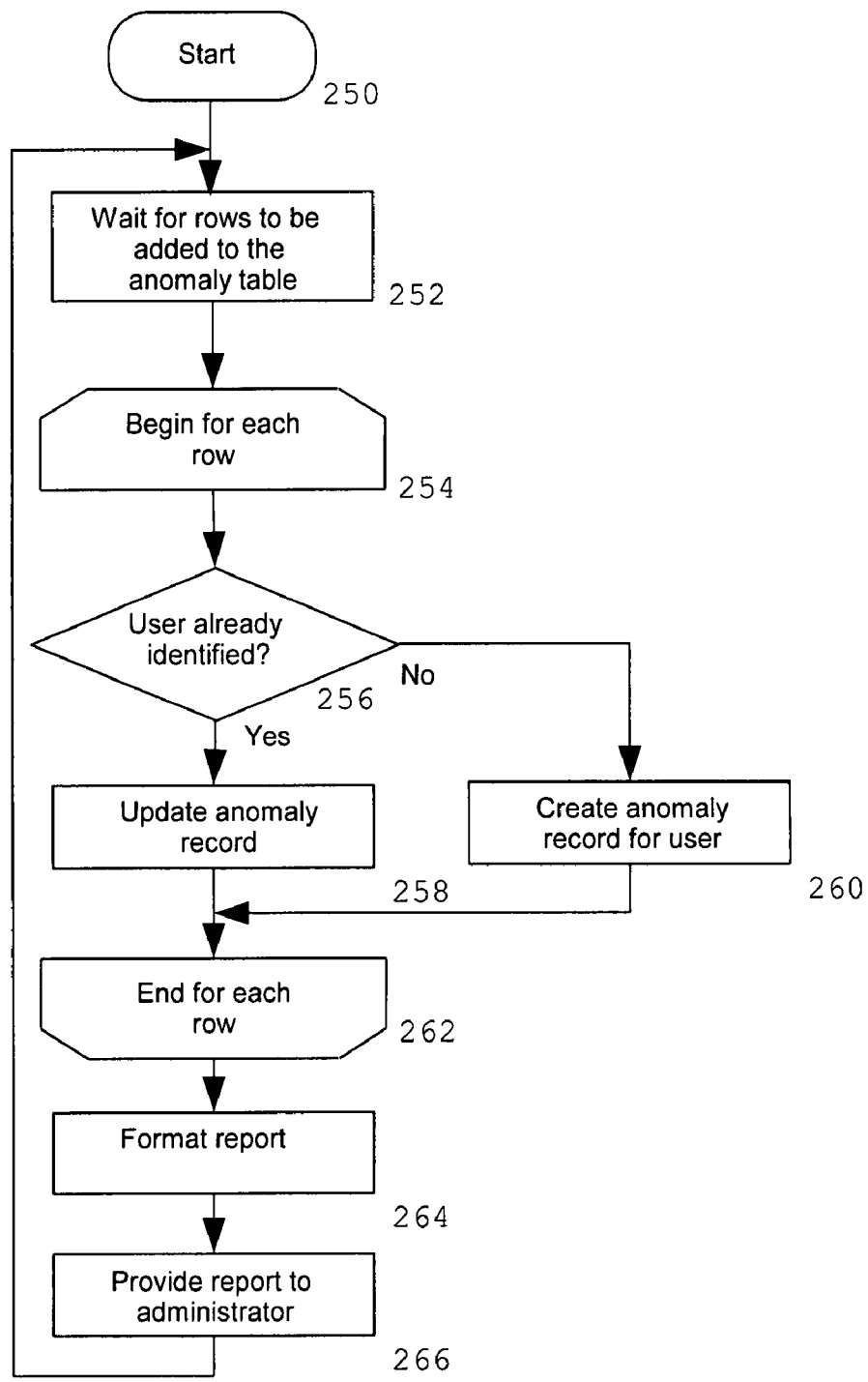
FIG. 12 is a flowchart illustrating the behavior of the anomalous access reporting component.

The behavior of the anomalous access reporting component (30) is illustrated by the flowchart of FIG. 12. There is a single thread of execution in this component.

At step 252, the thread will create an empty set of records and wait for rows to be added to the anomaly table (84) which this component has not already processed. At step 254, the thread will iterate through each row which the thread has not already processed. At step 256, the thread will extract the value of the USER ID column of the row. If the user ID matches the ID of a user already being processed in this report, then at step 258 the thread will add the anomaly information to the record for that user. Otherwise, at step 260, the thread will create a new record for that user.

At step 264, the thread will create a report based on the set of records constructed based on the rows of the anomaly table. At step 266, the thread will provide this report to the administrator.

CONCLUSIONS

Many different embodiments of this invention may be constructed without departing from the scope of this invention. While this invention is described with reference to various implementations and exploitations, and in particular with respect to intrusion detection systems, it will be understood that these embodiments are illustrative and that the scope of the invention is not limited to them.

What is claimed is:

1. A method of detecting and rejecting an anomalous access request from a client on behalf of a requesting user at a current date and time to a resource in a network environment, said method comprising:
   (a) providing a user calendar for a user comprising a predicted calendar record identifying a predicted location for said user at said current date and time and a previous calendar record identifying a previous location for said user at a previous date and time,
   (b) providing said client in said network environment,
   (c) retrieving said user calendar for said requesting user,
   (d) retrieving said predicted calendar record within said user calendar corresponding to said current date and time when said client has sent said request to said resource and said previous calendar record,
   (e) determining a location of said client corresponding to said current date and time when said client has sent said request to said resource,
   (f) computing a time difference from said current date and time and said previous date and time from said previous calendar record,
   (g) comparing said location with said predicted location for said user obtained from said predicted calendar record,
   (h) computing a minimum transit time for said user to travel between said location and said previous location from said previous calendar record,
   (i) rejecting said request if said location is inconsistent with said predicted location and said time difference is inconsistent with said minimum transit time between said location and said previous location.

2. The method of claim 1, wherein the step of determining a location of said client corresponding to said current date and time when said client has sent said request to said resource further comprises:
   (a) providing a location database comprising a network and a corresponding configured location,
   (b) identifying a source network in said request,
   (c) determining said location of said client based on comparing said location of said source network in said location database.

3. A system for detecting and rejecting an anomalous access request from a client on behalf of a requesting user at a current date and time to a resource in a network environment, comprising:
   (a) a processor,
   (b) a memory device coupled to said processor for storing computer-implemented instructions, when executed by said processor, providing
      (i) a user calendar for a user containing a predicted calendar record identifying a predicted location for said user at said current date and time and a previous calendar record identifying a previous location for said user at a previous date and time,
      (ii) a resource comprising a software application,
      (iii) said client which is able to send said access request to said resource on behalf of said user,
      (iv) a software agent which will intercept said access request,
      (v) a database which is operationally connected to said agent,
   wherein said user calendar, said resource, said client, said software agent and said database are implemented as software stored in said memory device running on a general-purpose computer system,
   said software agent will retrieve said user calendar for said requesting user, said software agent will retrieve said predicted calendar record within said user calendar corresponding to said current date and time when said client has sent said request to said resource and said previous calendar record,
   said software agent will determine a location of said client corresponding to said date and time when said client has sent said request to said resource,
   said software agent will compute a time difference from said current date and time and said previous date and time from said previous calendar record,
   said software agent will compare said location with said predicted location for said user obtained from said predicted calendar record,
   said software agent will compute a minimum transit time for said user to travel between said location and said previous location from said previous calendar record, and
   said software agent will reject said request if said location is inconsistent with said predicted location and said time difference is inconsistent with said minimum transit time between said location and said previous location.

4. The system of claim 3, wherein said database is implemented as a relational database comprising said user calendar and further comprising a location database comprising a network and a corresponding configured location, and said software agent will identify a source network in said request and determine said location of said client based on comparing said location of said source network in said location database.

5. A computer program product stored in a memory device with software for detection and rejection of an anomalous access request from a client on behalf of a requesting user at a current date and time to a resource in a network environment, said computer program product comprising:
   (a) computer-implemented instructions, when executed by a processor, for providing a user calendar for a user comprising a predicted calendar record identifying a predicted location for said user at said current date and time and a previous calendar record identifying a previous location for said user at a previous date and time,
   (b) computer-implemented instructions, when executed by said processor, for providing said client in said network environment,
   (c) computer-implemented instructions, when executed by said processor, for retrieving said predicted calendar record within said user calendar corresponding to said current date and time when said client has sent said request to said resource and said previous calendar record,
   (d) computer-implemented instructions, when executed by said processor, for determining a location of said client corresponding to said current date and time when said client has sent said request to said resource, (e) computer-implemented instructions, when executed by said processor, for computing a time difference from said current date and time and said previous date and time from said previous calendar record, (f) computer-implemented instructions, when executed by said processor, for comparing said location with a predicted location for said user obtained from said predicted calendar record, (g) computer-implemented instructions, when executed by said processor, for computing a minimum transit time for said user to travel between said location and said previous location from said previous calendar record, and (h) computer-implemented instructions, when executed by said processor, for rejecting said request if said location is inconsistent with said predicted location and said time difference is inconsistent with said minimum transit time between said location and said previous location.

6. The computer program product of claim 5, wherein the computer-implemented instructions for determining said location of said client when said client has sent said access request to said resource further comprises:

(a) computer-implemented instructions, when executed by a processor, for providing a location database comprising a network and a corresponding configured location, (b) computer-implemented instructions, when executed by said processor, for identifying a source network in said request, (c) computer-implemented instructions, when executed by said processor, for determining said location of said client based on comparing said location of said source network in said location database.

* * * * *